US008732494B2

(12) United States Patent
Niikura

(10) Patent No.: US 8,732,494 B2
(45) Date of Patent: May 20, 2014

(54) DATA PROCESSING APPARATUS AND METHOD FOR SELECTIVELY POWERING ON A PROCESSING UNIT BASED ON A CORRECT PORT NUMBER IN THE ENCRYPTED DATA PACKET

(75) Inventor: Yasuhito Niikura, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 681 days.

(21) Appl. No.: 12/138,288

(22) Filed: Jun. 12, 2008

(65) Prior Publication Data

US 2009/0013200 A1    Jan. 8, 2009

(30) Foreign Application Priority Data

Jul. 3, 2007   (JP) ................................. 2007-175327

(51) Int. Cl.
*G06F 1/26*    (2006.01)
*G06F 1/04*    (2006.01)
*G06F 1/32*    (2006.01)

(52) U.S. Cl.
USPC ............................ 713/320; 713/340; 713/324

(58) Field of Classification Search
USPC .................. 713/320, 20, 200, 310, 321, 340; 700/20
See application file for complete search history.

(56) References Cited

U.S. PATENT DOCUMENTS

| | | | | |
|---|---|---|---|---|
| 5,598,408 A | * | 1/1997 | Nickolls et al. ............... | 370/351 |
| 5,682,491 A | * | 10/1997 | Pechanek et al. ............. | 712/209 |
| 5,742,180 A | * | 4/1998 | DeHon et al. .................. | 326/40 |
| 5,890,217 A | * | 3/1999 | Kabemoto et al. ............ | 711/141 |
| 6,535,985 B1 | * | 3/2003 | Oshima et al. ................ | 713/323 |
| 6,922,783 B2 | * | 7/2005 | Knee et al. .................... | 713/320 |
| 7,016,249 B2 | * | 3/2006 | Ross .............................. | 365/226 |
| 7,028,196 B2 | * | 4/2006 | Soltis et al. ................... | 713/300 |
| 7,464,281 B2 | * | 12/2008 | Oshima et al. ................ | 713/324 |
| 7,792,066 B2 | * | 9/2010 | Fujii et al. ..................... | 370/311 |
| 7,853,808 B2 | * | 12/2010 | Kim et al. ..................... | 713/300 |
| 2002/0091954 A1 | * | 7/2002 | Rhee et al. .................... | 713/320 |
| 2003/0088800 A1 | * | 5/2003 | Cai ................................ | 713/320 |
| 2004/0003309 A1 | * | 1/2004 | Cai et al. ....................... | 713/320 |
| 2004/0186979 A1 | * | 9/2004 | Janke et al. ...................... | 712/1 |
| 2005/0086405 A1 | * | 4/2005 | Kobayashi et al. ........... | 710/260 |

(Continued)

FOREIGN PATENT DOCUMENTS

| | | |
|---|---|---|
| EP | 1392032 A1 | 2/2004 |
| JP | 2002-354064 A | 12/2002 |

(Continued)

*Primary Examiner* — Thomas Lee
*Assistant Examiner* — Phil Nguyen
(74) *Attorney, Agent, or Firm* — Canon USA, Inc. IP Division

(57) ABSTRACT

A data processing apparatus includes a receiving unit configured to receive data, a first processing unit configured to perform predetermined processing on the received data, a second processing unit configured to perform the predetermined processing on the received data, a first control unit configured to perform control so that the data processing apparatus operates in one of a first operation mode for supplying power to both the first processing unit and the second processing unit and a second operation mode for discontinuing a supply of power to the first processing unit while supplying power to the second processing unit, and a second control unit configured to perform control so that the first processing unit performs the predetermined processing if the data processing apparatus operates in the first operation mode and that the second processing unit performs the predetermined processing if the data processing apparatus operates in the second operation mode.

13 Claims, 13 Drawing Sheets

(56) References Cited

U.S. PATENT DOCUMENTS

| | | | |
|---|---|---|---|
| 2005/0097332 A1* | 5/2005 | Imai | 713/176 |
| 2006/0282690 A1* | 12/2006 | Cromer et al. | 713/300 |
| 2007/0096775 A1* | 5/2007 | Elgebaly et al. | 327/105 |
| 2008/0104425 A1* | 5/2008 | Gunther et al. | 713/300 |
| 2008/0109639 A1* | 5/2008 | Charra et al. | 712/30 |
| 2008/0168176 A1* | 7/2008 | Bruss | 709/230 |
| 2008/0172507 A1* | 7/2008 | Thurber et al. | 710/105 |
| 2008/0240135 A1* | 10/2008 | Weast | 370/402 |
| 2008/0256626 A1* | 10/2008 | Masui | 726/20 |
| 2009/0077347 A1* | 3/2009 | Edwards et al. | 712/34 |
| 2009/0193243 A1* | 7/2009 | Ely | 713/2 |
| 2010/0115302 A1* | 5/2010 | Cho et al. | 713/310 |

FOREIGN PATENT DOCUMENTS

| | | |
|---|---|---|
| JP | 2002-354604 A | 12/2002 |
| JP | 2007-179225 A | 7/2007 |
| JP | 2008-139932 A | 6/2008 |
| JP | 2008-141290 A | 6/2008 |
| KR | 10-1997-0028958 A | 6/1997 |
| KR | 20-1999-0034115 A | 8/1999 |
| KR | 10-2006-0064973 A | 6/2006 |
| WO | 02/17064 A2 | 2/2002 |
| WO | 2006-069605 A1 | 7/2006 |

* cited by examiner

FIG.2

| LAYER 7<br>APPLICATION<br>LAYER | APPLICATION<br>LAYER<br>204 | HTTP | LPR | rawTCP | SMTP | POP3 |
|---|---|---|---|---|---|---|
| LAYER 6<br>PRESENTATION<br>LAYER | | | | | | |
| LAYER 5<br>SESSION<br>LAYER | | | | | | |
| LAYER 4<br>TRANSPORT<br>LAYER | TRANSPORT<br>LAYER<br>203 | TCP/UDP | | | | |
| LAYER 3<br>NETWORK<br>LAYER | INTERNET<br>LAYER<br>202 | IP | | | | |
| LAYER 2<br>DATA LINK<br>LAYER | NETWORK<br>INTERFACE<br>LAYER<br>201 | ETHERNET | | | | |
| LAYER 1<br>PHYSICAL<br>LAYER | | | | | | |

OSI REFERENCE MODEL

IN THE CASE OF
RECEIVING IPSec

IN THE CASE WHERE PROCESSING SHIFTS TO HARDWARE PROCESSING AFTER PROCESSING IPSec SOFTWARE

107 LAN I/F

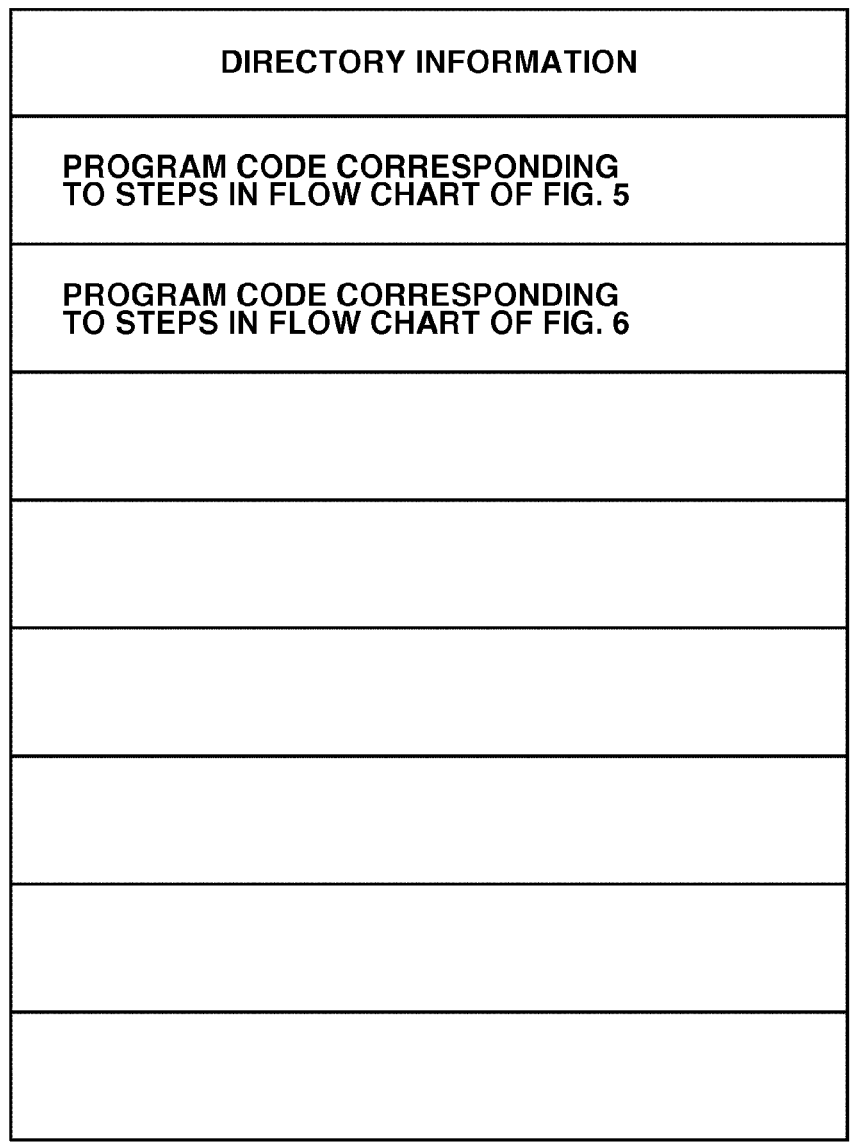

ary embodiment of the present invention.

DATA PROCESSING APPARATUS AND METHOD FOR SELECTIVELY POWERING ON A PROCESSING UNIT BASED ON A CORRECT PORT NUMBER IN THE ENCRYPTED DATA PACKET

BACKGROUND OF THE INVENTION

1. Field of the Invention

The present invention relates to a data processing apparatus and a control method therefor.

2. Description of the Related Art

When data processing is performed by software, a central processing unit (CPU) bears a heavy burden. Thus, a conventional data processing apparatus generally includes a hardware accelerator that performs data processing.

Japanese Patent Application Laid-Open No. 2002-354064 discusses an apparatus including a processing unit that performs protocol processing by hardware and a processing unit that performs protocol processing by software.

Internet protocol security (IPSec) processing has been conventionally performed by a data processing apparatus. Here, an "IPSec" refers to a protocol used for performing authentication processing and encryption processing in a network layer, which is the third layer of the Open System Interconnection (OSI) reference model.

If a data processing apparatus is provided with a hardware accelerator for performing IPSec processing, the processing load on a CPU can be reduced. However, in this case, it is necessary to always keep the data processing apparatus powered on, which may increase the power consumption of the entire system.

SUMMARY OF THE INVENTION

The present invention is directed to a data processing apparatus configured to appropriately control the power supply to a plurality of processing units that can perform predetermined processing and reduce power consumption of the data processing apparatus while maintaining a high data processing speed.

According to an aspect of the present invention, a data processing apparatus includes a receiving unit configured to receive data, a first processing unit configured to perform predetermined processing on the data received by the receiving unit, a second processing unit configured to perform said predetermined processing on the data received by the receiving unit, a first control unit configured to perform control so that the data processing apparatus operates in one of a first operation mode for supplying power to both the first processing unit and the second processing unit and a second operation mode for discontinuing the supply of power to the first processing unit while supplying power to the second processing unit, and a second control unit configured to perform control such that the first processing unit performs the predetermined processing if the data processing apparatus operates in the first operation mode, and such that the second processing unit performs the predetermined processing if the data processing apparatus operates in the second operation mode.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 illustrates the OSI Reference Model and a hierarchical structure according to the general Transmission Control Protocol/Internet Protocol (TCP/IP).

FIG. 13 illustrates a memory map of a storage medium that stores various data processing programs that can be read by a data processing apparatus according to an exemplary embodiment of the present invention.

DETAILED DESCRIPTION OF THE EMBODIMENTS

Various exemplary embodiments, features, and aspects of the present invention will now be described in detail with reference to the drawings. It is to be noted that the relative arrangement of the components, the numerical expressions, and numerical values set forth in these embodiments are not intended to limit the scope of the present invention unless it is specifically stated otherwise.

First Exemplary Embodiment

Figure 1:
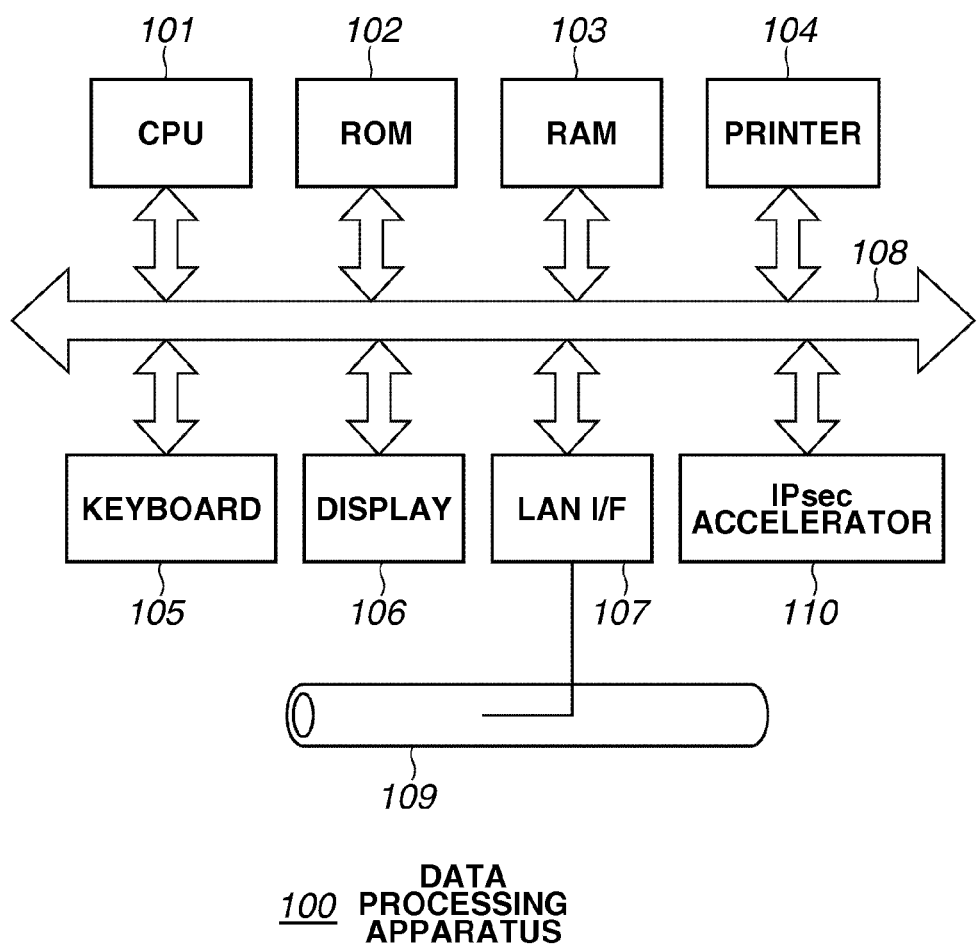
FIG. 1 illustrates a configuration of a data processing apparatus according to a first exemplary embodiment of the present invention.

A first exemplary embodiment of the present invention will now be described. FIG. 1 illustrates a configuration of a data processing apparatus according to a first exemplary embodiment of the present invention.

Referring to FIG. 1, a data processing apparatus 100 includes a central processing unit (CPU) 101, a read-only memory (ROM) 102, a random access memory (RAM) 103, a printer 104, a keyboard 105, a display 106, a local area network (LAN) interface (I/F) 107, and an IPSec accelerator 110, which are in communication with one another via a system bus 108.

The CPU 101 of the data processing apparatus 100 executes a program stored on the ROM 102 and controls the entire operation of the data processing apparatus 100.

Figure 3:
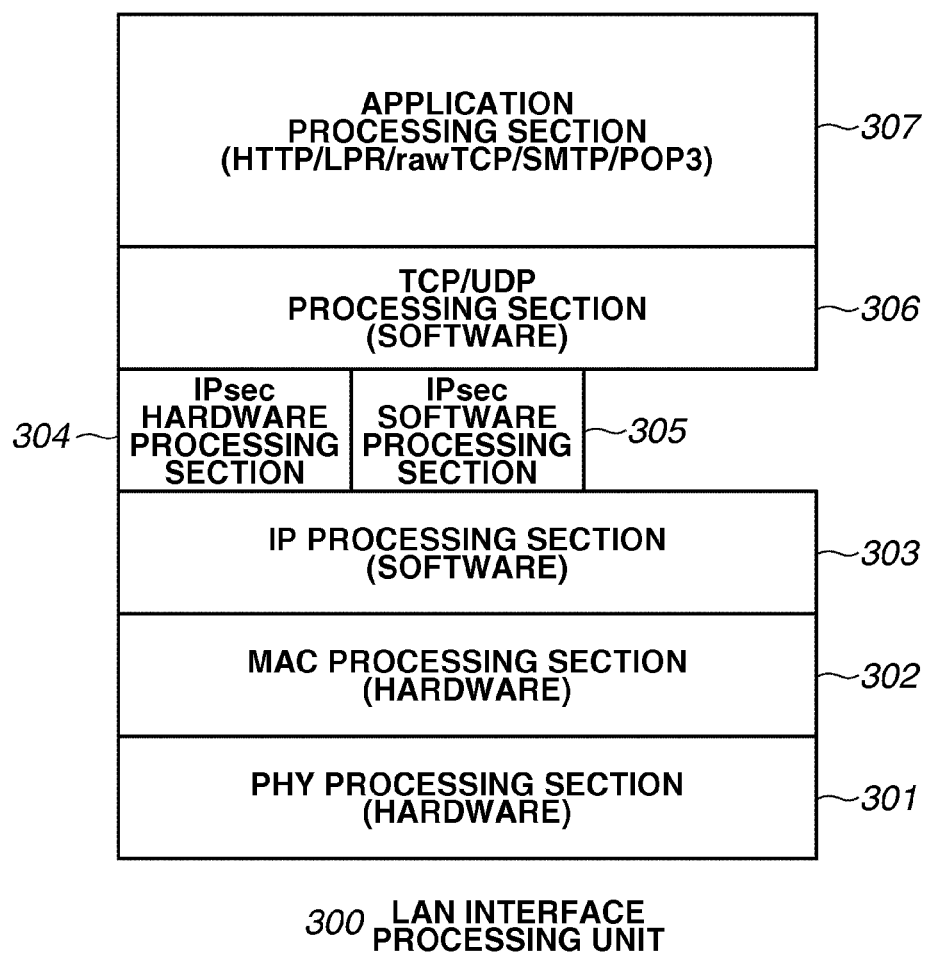
FIG. 3 illustrates LAN interface processing performed by the data processing apparatus according to an exemplary embodiment of the present invention.

The ROM 102 stores an IP processing section 303 (FIG. 3), an IPSec software section 305 (FIG. 3), a transmission control protocol/user datagram protocol (TCP/UDP) processing function 306 (FIG. 3), and an application processing section 307 (FIG. 3). Furthermore, the ROM 102 also stores a program for controlling the operation of the printer 104 and the display 106.

The RAM 103 functions as a buffer area for temporarily storing data transmitted within the data processing apparatus 100 and a work area for storing a program executed by the CPU 101. The printer 104 has a function for printing data received via the LAN I/F 107 and data input by a user via the keyboard 105.

The keyboard 105 is an input device used for inputting various settings for the data processing apparatus 100. Furthermore, the keyboard 105 is used by a user to select a port number and a priority mode according to processing illustrated in a flow chart of FIG. 3. The display 106 is a display device that displays information and various setting values input by the user via the keyboard 105 and status information about the system.

The LAN I/F 107 is connected to a network 109 and receives data from another apparatus connected to the data processing apparatus 100 via the network 109, and performs physical (PHY) processing and media access control (MAC) processing. Furthermore, the LAN I/F 107 sends data to another apparatus connected to the data processing apparatus 100 via the network 109 as necessary. The PHY processing and the MAC processing will be described below in more detail. An IPSec accelerator 110 includes the IPSec hardware processing section 304 (FIG. 3) and performs IPSec processing. The IPSec accelerator 110 will be described below in more detail The components of the data processing apparatus 100, namely, the CPU 101, the ROM 102, the RAM 103, the printer 104, the keyboard 105, the display 106, the LAN I/F 107, and the IPSec accelerator 110 are connected and perform data communication with each other via the bus 108.

The data processing apparatus 100 can include an external storage device such as a hard disk (not illustrated) The CPU 101 can load a program from the external storage device on the RAM 103 to control the entire operation of the data processing apparatus 100. In the case where the data processing apparatus 100 is a network printer, the keyboard 105 and the display 106 constitute an operation unit of the network printer.

In the example illustrated in FIG. 1, it is assumed that the data processing apparatus 100 is the network printer. However, the data processing apparatus 100 of the present invention is not limited to the network printer. That is, an apparatus that can perform an IPSec communication, such as a personal computer or any other network apparatuses, can be used as the data processing apparatus 100 to which the present invention can be applied.

FIG. 2 illustrates the OSI Reference Model and a hierarchical structure according to the general transmission control protocol/Internet protocol (TCP/IP).

Referring to FIG. 2, the TCP/IP structure includes a network interface layer 201, an Internet layer 202, a transport layer 203, and an application layer 204.

The network interface layer 201 includes both a first layer (a physical layer) and a second layer (a data link layer) of the OSI Reference Model. The network interface layer 201 corresponds to a PHY processing section 301 (FIG. 3) and a MAC processing section 302 (FIG. 3) that are compliant with Ethernet.

The Internet layer 202 is the third layer of the OSI Reference Model (the network layer). The Internet layer 202 corresponds to the IP processing section 303 (FIG. 3), the IPSec hardware processing section 304 (FIG. 3), and the IPSec software processing section 305 (FIG. 3). The transport layer 203 is the fourth layer (transport layer) of the OSI Reference Model. The transport layer 203 corresponds to the TCP/UDP processing section 306 (FIG. 3).

The application layer 204 includes the fifth layer (the session layer), the sixth layer (the presentation layer), and the seventh layer (the application layer) of the OSI Reference Model. The application layer 204 corresponds to the application processing section 307 (FIG. 3).

FIG. 3 illustrates exemplary LAN interface processing performed by the data processing apparatus 100 according to the present exemplary embodiment.

Referring to FIG. 3, a LAN interface processing section 300 includes the PHY processing section 301, the MAC processing section 302, the IP processing section 303, the IPSec hardware processing section 304, the IPSec software processing section 305, the TCP/UDP processing section 306, and the application processing section 307.

The PHY processing section 301 physically connects the LAN interface processing section 300 of the data processing apparatus 100 to the LAN 109. The PHY processing section 301 is hardware that performs data conversion processing on a received signal and performs signal conversion processing on data to be transmitted. The PHY processing section 301 is provided within the LAN I/F 107.

The MAC processing section 302 is hardware that performs the filtering of data received by the PHY processing section 301 using a MAC address, to determine whether the data is sent to the data processing apparatus 100. The MAC processing section 302 is provided within the LAN I/F 107.

The IP processing section 303 is a software processing section that allocates a unique address (IP address) to the system and performs processing for sending data and information to another apparatus connected to the data processing apparatus 100 via the network 109 based on the allocated IP address. In addition, the IP processing section 303 includes a function for determining whether a current communication is performed by an IPSec communication.

The IPSec hardware processing section (a first processing section) 304 is a hardware processing section that compresses an encapsulating security payload (ESP), which is encrypted packet data, and decompresses the compressed ESP. The IPSec hardware processing section 304 is provided within the IPSec accelerator 110.

The IPSec software processing section (a second processing section) 305 compresses the ESP, which is encrypted packet data, and decompresses the compressed ESP similar to the above-described IPSec hardware processing section 304. That is, the IPSec hardware processing section 304 and the IPSec software processing section 305 have the similar processing function, namely, the IPSec processing function.

The TCP/UDP processing section 306 is a software processing section having a function for controlling a TCP protocol defined by the Request for Comments (RFC) 793 and a UDP protocol defined by the RFC 768. The application processing section 307 is a software processing section that performs various application processing such as simple mail transfer protocol (SMTP) processing and hypertext transport protocol (HTTP) processing utilizing data transmitted and received by the TCP/UDP processing section 306.

The CPU 101 implements the functions of the IP processing section 303, the IPSec software processing section 305, the TCP/UDP processing section 306, and the application processing section 307 by loading the program from the ROM 102 and executing the loaded program.

Figure 4:
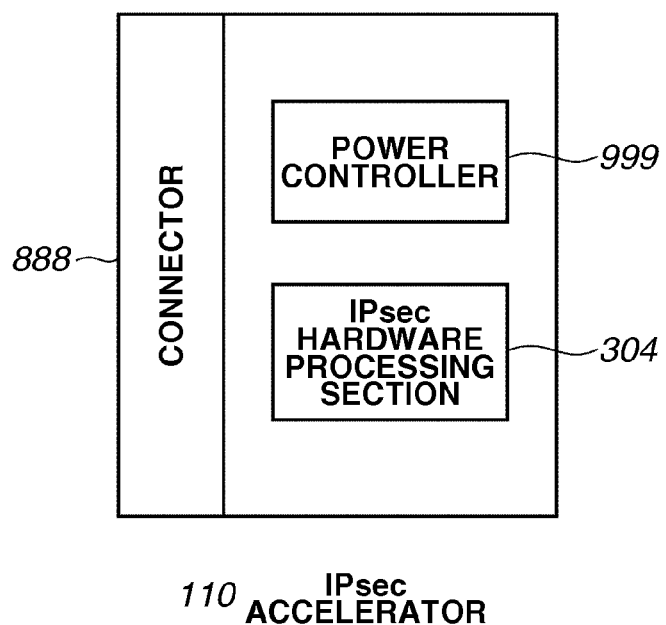
FIG. 4 illustrates a configuration of an IPSec accelerator illustrated in FIG. 1 according to an exemplary embodiment of the present invention.

FIG. 4 illustrates an exemplary configuration of the IPSec accelerator 110 illustrated in FIG. 1 according to the present exemplary embodiment.

Referring to FIG. 4, a connector 888 is a unit for connecting the IPSec accelerator 110 to the data processing apparatus 100 via the bus 108. A power controller 999 is supplied with power from a power source unit (not illustrated) of the data processing apparatus 100 and supplies power to each section and unit of the IPSec accelerator 110.

In addition, the power controller 999 can switch between a power supply mode for supplying power to the IPSec hardware processing section 304 and a power supply suspension mode for suspending the power supply to the IPSec hardware processing section 304 based on an instruction from the CPU 101.

Now, processing for monitoring and suspending a IPSec hardware processing section according to the present exemplary embodiment will be described below with reference to a flow chart of FIG. 5.

Figure 5:
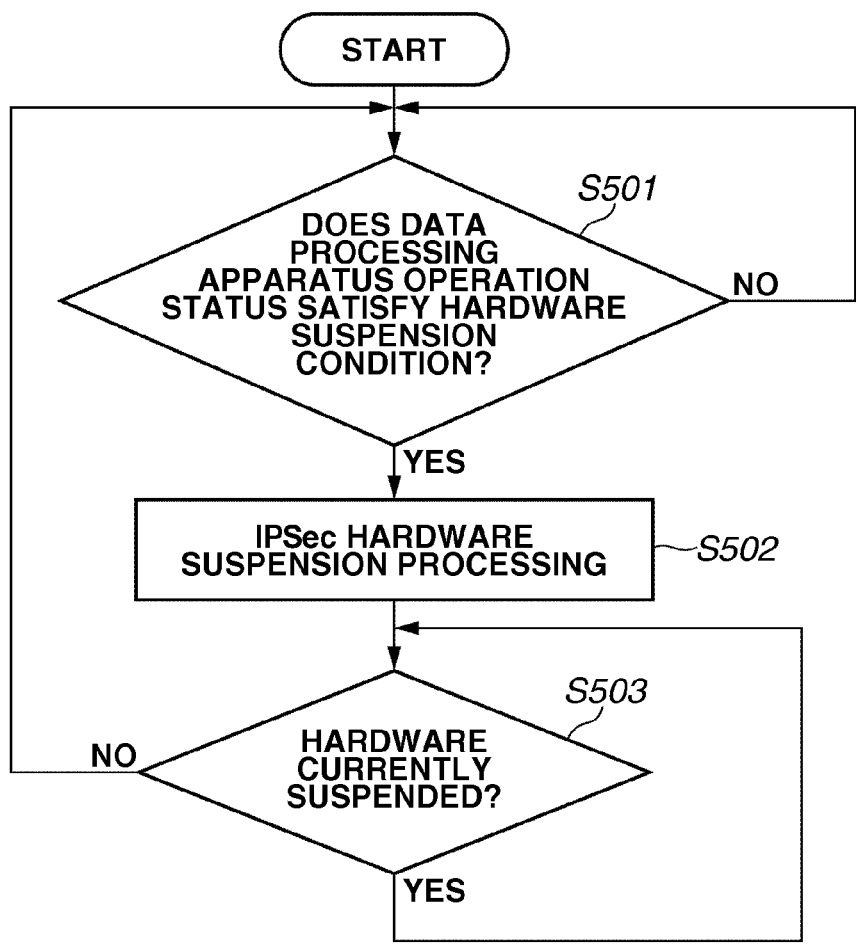
FIG. 5 is a flow chart illustrating control processing according to an exemplary embodiment of the present invention.

FIG. 5 is a flow chart illustrating control processing according to the present exemplary embodiment. More specifically, the exemplary processing illustrated in FIG. 5 is the processing for monitoring and suspending the IPSec hardware processing section according to the present exemplary embodiment. The function illustrated in the flow chart of FIG. 5 is implemented by the CPU 101 by executing the program stored in the ROM 102.

Referring to FIG. 5, in step S501, the CPU 101 checks whether a status of the data processing apparatus 100 satisfies a condition for suspending the IPSec hardware processing section 304 (a hardware suspension condition).

More specifically, the CPU 101 determines that the status of the data processing apparatus 100 satisfies the condition for suspending the IPSec hardware processing section 304 (the hardware suspension condition) a) if the data processing apparatus 100 has not received data, b) if the data processing apparatus 100 has received data but the IPSec processing has not been performed (the data communication is not an IPSec communication), or c) if the data has been received by the IPSec communication but it is determined that it is appropriate to process the data with the IPSec software processing section 305. That is, if it is determined in step S501 that the status of the data processing apparatus 100 satisfies either one of the above-described conditions (YES in step S501), then the CPU 101 determines that the status of the data processing apparatus 100 satisfies the condition for suspending the IPSec hardware processing section 304. On the other hand, if it is determined in step S501 that the status of the data processing apparatus 100 does not satisfy any of the above-described conditions (NO in step S501), then the CPU 101 determines that the status of the data processing apparatus 100 does not satisfy the condition for suspending the IPSec hardware processing section 304.

The CPU 101 determines whether it is appropriate to process the data with the IPSec software processing section 305 based on the protocol of the received data. For example, in the case of a packet sent based on an Internet control message protocol (ICMP) or an address resolution protocol (ARP), the data communication is completed only by transmitting several packets. In this case, the CPU 101 determines that it is appropriate to process the data with the IPSec software processing section 305.

On the other hand, in the case of data sent by a line printer (LPR) protocol or a raw TCP protocol for printing the data received from PC, a large number of packets are transmitted to complete the data communication. In this case, the printing speed (pages per minute (ppm)) becomes low because it takes too long to process the data with the IPSec software processing section 305. Accordingly, the CPU 101 determines that a problem occurs if the data is processed by the IPSec software processing section 305.

In the present exemplary embodiment, a user previously inputs a port number of the protocol with which such a problem occurs (namely, the LPR protocol or the raw TCP) via the keyboard 105 and the CPU 101 stores (sets) the input port number in a non-volatile memory area of the RAM 103. Alternatively, the port number of the protocol with which the problem occurs is previously stored in a non-volatile memory area of the ROM 102 before the shipment of the data processing apparatus 100 from the factory.

If a sending destination port number included in the received data (a TCP/UDP packet) does not match the previously-set port number (for example, a port number for an LPR protocol or a raw TCP protocol), then the CPU 101 determines that it is appropriate to process the data with the IPSec software processing section 305. On the other hand, if a sending destination port number included in the received data (a TCP/UDP packet) matches the previously-set port number, then the CPU 101 determines that it is inappropriate to process the data with the IPSec software processing section 305.

If it is determined in step S501 that the status of the data processing apparatus 100 does not satisfy the hardware suspension condition (NO in step S501), then the CPU 101 continues the processing for monitoring the hardware suspension condition in step S501.

On the other hand, if it is determined in step S501 that the status of the data processing apparatus 100 satisfies the hardware suspension condition (YES in step S501), then the processing advances to step S502.

In step S502, the CPU 101 suspends the IPSec hardware processing. More specifically, the CPU 101 instructs the power controller 999 of the IPSec accelerator 110 to suspend the power supply to the IPSec hardware processing section 304. After receiving the instruction from the CPU 101 for suspending the power supply, the power supply controller 999 suspends the power supply to the IPSec hardware processing section 304. By powering off the IPSec hardware processing section 304 as described above, the power consumption of the data processing apparatus 100 can be reduced.

In step S503, the CPU 101 determines whether the IPSec hardware processing section 304 is currently suspended (whether the power is not supplied to the IPSec hardware processing section 304).

If it is determined in step S503 that the IPSec hardware processing section 304 is currently suspended (i.e., that the power is not being supplied to the IPSec hardware processing section 304) (YES in step S503), then the CPU 101 continues the monitoring processing in step S503. On the other hand, if it is determined in step S503 that the IPSec hardware processing section 304 is not suspended (i.e., that the power is currently being supplied to the IPSec hardware processing section 304) (NO in step S503), then the CPU 101 returns to step S501 to monitor the hardware suspension condition.

The LAN interface processing illustrated in FIG. 3 will be described below with reference to a flow chart of FIG. 6.

Figure 6:
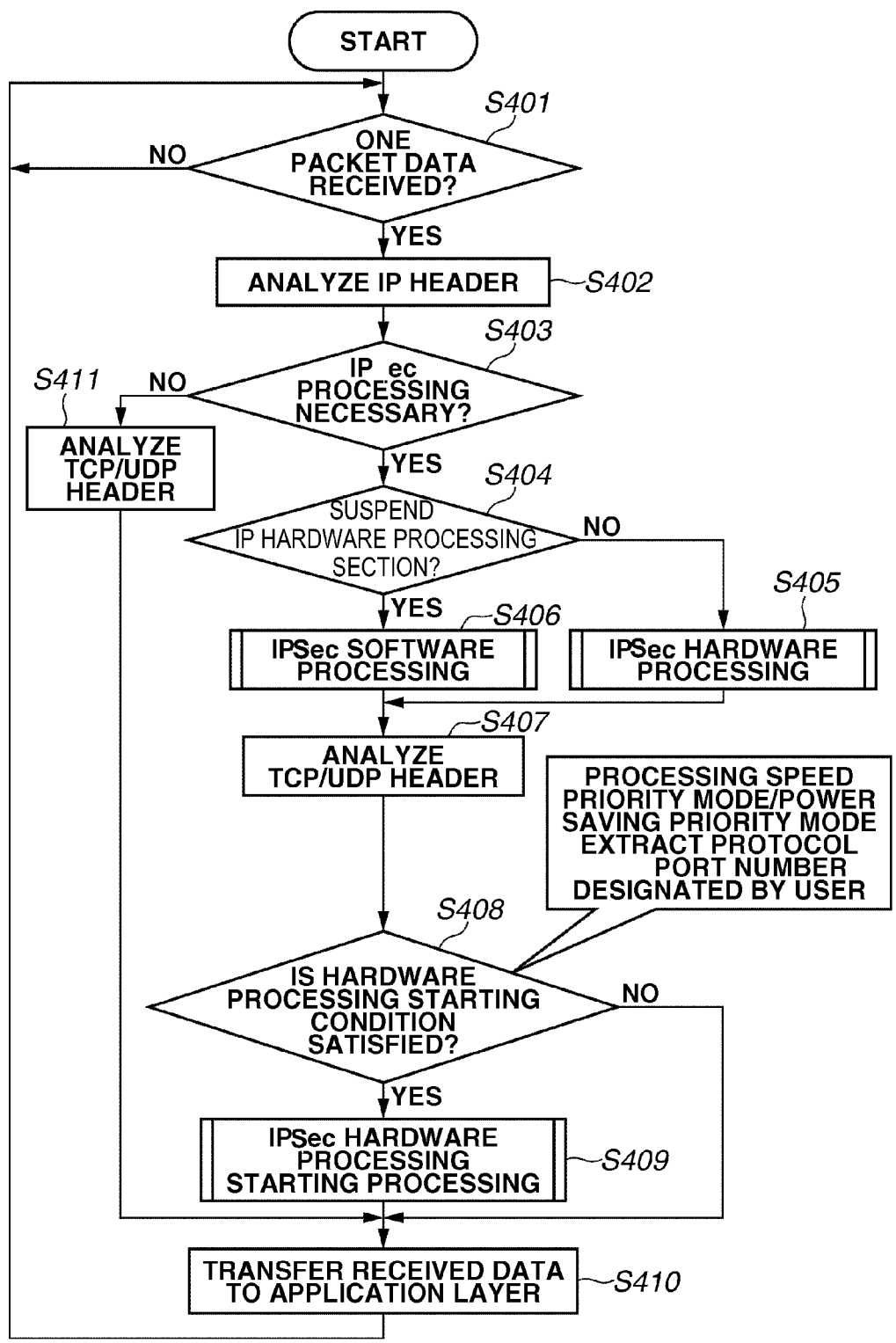
FIG. 6 is a flow chart illustrating control processing according to an exemplary embodiment of the present invention.

FIG. 6 is a flow chart illustrating control processing according to the present exemplary embodiment. More specifically, the exemplary processing illustrated in FIG. 6 is the LAN interface processing illustrated in FIG. 3. The processing in steps S401 through S404 and steps S406 through S411 in the flow chart of FIG. 6 are performed by the IP processing section 303, the IPSec hardware processing section 304, the IPSec software processing section 305, or the TCP/UDP processing section 306. Each process is implemented by the CPU 101 by executing a program from the ROM 102. In addition, the processing in step S405 is performed by the IPSec hardware processing section 304.

Referring to FIG. 6, in step S401, the IP processing section 303 (the CPU 101) monitors whether data has been received via the network 109, and continues the data reception monitoring processing until one packet data (an IP packet) is received via the network 109.

If it is determined in step S401 that one data packet has been received via the network 109 (YES in step S401), then the processing advances to step S402. In step S402, the IP processing section 303 analyzes the IP header of the packet. More specifically, in step S402, the IP processing section 303 extracts a sending source IP address and a sending destination IP address included in the IP header of the received data (IP packet) to verify whether the data has been sent addressed to the data processing apparatus 100. Furthermore, in step S402, the IP processing section 303 extracts an IP protocol number included in the IP header.

In step S403, the IP processing section 303 determines whether it is necessary to perform the IPSec processing on the received data. More specifically, the IP processing section 303 determines that it is necessary to perform the IPSec processing on the received data if the IP protocol number acquired in step S402 is the ESP port number (the port number 50), which is IPSec data.

On the other hand, the IP processing section 303 determines that it is not necessary to perform the IPSec processing on the received data if the IP protocol number acquired in step S402 is not the ESP port number (the port number 50).

If it is determined in step S403 that it is not necessary to perform the IPSec processing (NO in step S403), then the processing advances to step S411. In step S411, the IP processing section 303 sends data included in the IP packet to the TCP/UDP processing section 306 as a TCP/UDP packet. When the TCP/UDP packet is received from the IP processing section 303, the TCP/UDP processing section 306 (the CPU 101) analyzes a TCP/UDP header. More specifically, the TCP/UDP processing section 306 performs processing for controlling a TCP protocol defined by the RFC 793 and a UDP protocol defined by the RFC 768. Then, the processing advances to step S410.

In step S410, the TCP/UDP processing section 306 sends the received data (a data portion included in the TCP/UDP packet) to the application processing section 307. When the processing in step S410 is completed, the IP processing section 303 returns to step S401 and repeats the data reception monitoring processing in step S401.

On the other hand, if it is determined in step S403 that it is necessary to perform the IPSec processing on the received data (YES in step S403), then the processing advances to step S404. In step S404, the CPU 101 determines whether the IPSec hardware processing section 304 has been suspended.

If it is determined in step S404 that the IPSec hardware processing section 304 has not been suspended (i.e., that the IPSec hardware processing section 304 is currently powered on) (NO in step S404), then the processing advances to step S405. In step S405, the CPU 101 performs control for transferring the ESP, which is encrypted packet data, from the IP processing section 303 to the IPSec hardware processing section 304. Then, the IPSec hardware processing section 304 decodes (decompresses) the ESP received from the IP processing section 303, converts the decoded ESP into a TCP/UDP packet, and then transfers the converted TCP/UDP packet to the TCP/UDP processing section 306.

On the other hand, if it is determined in step S404 that the IPSec hardware processing section 304 has been suspended (i.e., that the IPSec hardware processing section 304 is currently powered off) (YES in step S404), then the processing advances to step S406. In step S406, the CPU 101 performs control for transferring the ESP, which is encrypted packet data, from the IP processing section 303 to the IPSec software processing section 305. Then, the IPSec software processing section 305 decodes (decompresses) the ESP received from the IP processing section 303, converts the decoded ESP into a TCP/UDP packet, and then transfers the converted TCP/UDP packet to the TCP/UDP processing section 306.

In step S407, after receiving the TCP/UDP packet from the IPSec hardware processing section 304 or the IPSec software processing section 305, the TCP/UDP processing section 306 analyzes the TCP/UDP header. More specifically, the TCP/UDP processing section 306 performs processing for controlling a TCP protocol defined by the RFC 793 and a UDP protocol defined by the RFC 768. In addition, the TCP/UDP processing section 306 extracts a sending destination port number from the TCP/UDP header.

In step S408, the CPU 101 determines whether the status of the data processing apparatus 100 satisfies a condition for activating the IPSec hardware processing section 304 (a hardware starting condition). The CPU 101 determines whether to power on the IPSec hardware processing section 304 based on a result of the determination in step S408. Here, a "hardware starting condition" includes a condition that the IPSec hardware processing section 304 is currently powered off and that it is inappropriate to process the data received in step S401 with the IPSec software processing section 305. More specifically, the CPU 101 determines that the status of the data processing apparatus 100 does not satisfy the hardware starting condition if the IPSec hardware processing section 304 has not been powered off.

On the other hand, if it is determined that the IPSec hardware processing section 304 has been powered off, then the CPU 101 further determines whether it is appropriate to process the data received in step S401 with the IPSec software processing section 305. More specifically, the CPU 101 determines whether the sending destination port number acquired in step S407 matches a previously set port number (i.e., a port number for a protocol with which a large number of packets are transmitted to complete a data communication (for example, an LPR protocol or a raw TCP protocol) as described with respect to the processing in step S501 in FIG. 5).

Here, the CPU 101 determines that it is inappropriate to process the data received in step S401 with the IPSec software processing section 305 if it is determined in step S408 that the sending destination port number acquired in step S407 matches the previously set port number. On the other hand, if it is determined in step S408 that the sending destination port number acquired in step S407 does not match the previously set port number, then the CPU 101 determines that it is appropriate to process the data received in step S401 with the IPSec software processing section 305.

Here, the CPU 101 determines that the status of the data processing apparatus 100 does not satisfy the hardware starting condition if it is determined in step S408 that it is appropriate to process the data received in step S401 with the IPSec software processing section 305. On the other hand, the CPU 101 determines that the status of the data processing apparatus 100 satisfies the hardware starting condition if it is determined in step S408 that it is inappropriate to process the data received in step S401 with the IPSec software processing section 305.

If it is determined in step S408 that the status of the data processing apparatus 100 does not satisfy the hardware starting condition (NO in step S408), then the processing advances to step S410. On the other hand, if it is determined in step S408 that the status of the data processing apparatus 100 satisfies the hardware starting condition (YES in step S408), then the processing advances to step S409.

In step S409, the CPU 101 performs IPSec hardware starting processing. More specifically, the CPU 101 issues an instruction to the power controller 999 for starting the supply of power to the IPSec hardware processing section 304. After receiving the instruction for starting the supply of power, the power controller 999 starts to supply power to the IPSec hardware processing section 304.

In step S410, the TCP/UDP processing section 306 sends the received data (the data portion of the TCP/UDP packet) to the application processing section 307. When the processing in step S403 is completed, the IP processing section 303 proceeds with the data reception monitoring processing in step S401.

LAN interface processing illustrated in FIG. 6 will be described in detail below with reference to FIGS. 7 through 10. First, the LAN interface processing performed in the case where a normal IP packet is received will be described with reference to FIG. 7.

Figure 7:
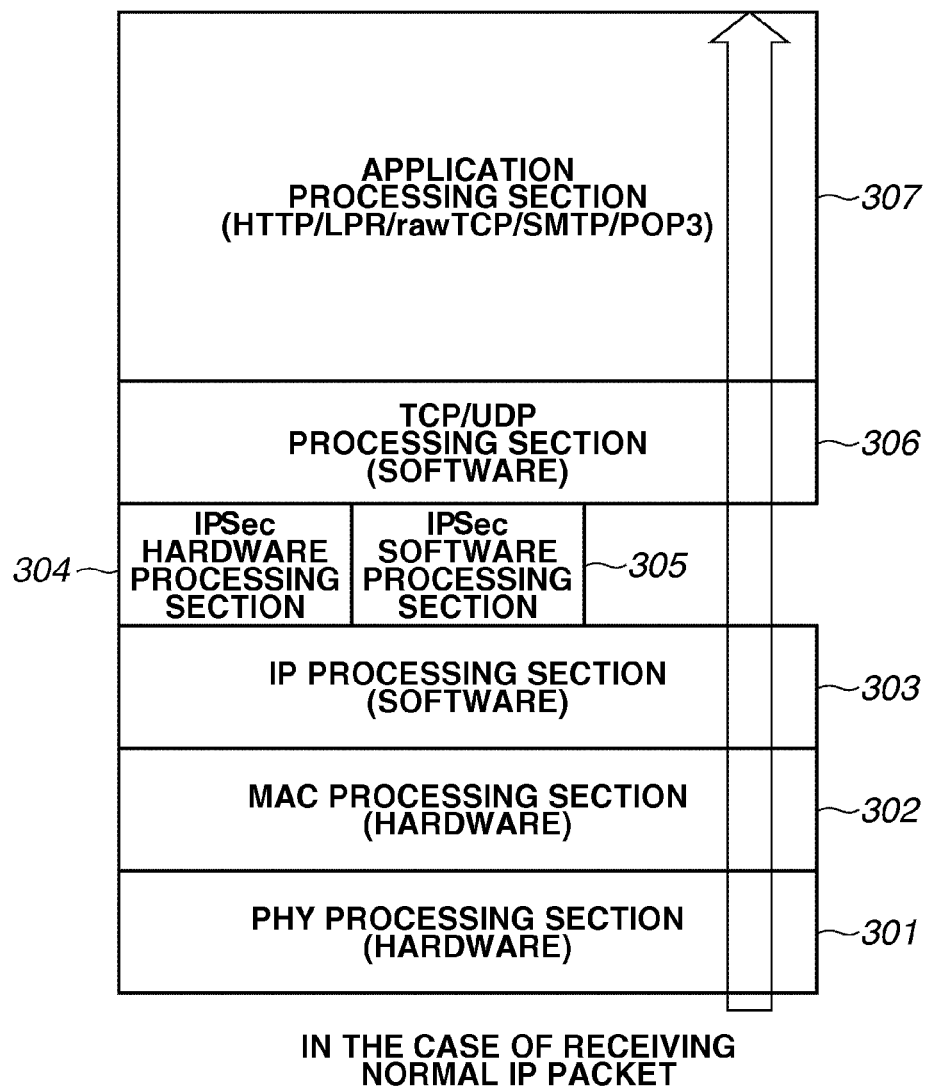
FIG. 7 illustrates LAN interface processing performed in the case where a normal IP packet is received, according to an exemplary embodiment of the present invention.

FIG. 7 illustrates LAN interface processing performed in the case where a normal IP packet is received according to the present exemplary embodiment.

Referring to FIG. 7, in step S401 (FIG. 6), the IP processing section 303 (the CPU 101) receives data of one packet via the network 109. In step S402 (FIG. 6), the IP processing section 303 performs IP header analysis processing. Further, the IP processing section 303 extracts the IP protocol number included in an IP header.

In step S403 (FIG. 6), the IP processing section 303 determines whether it is necessary to perform the IPSec processing on the received data. In the example illustrated in FIG. 7, the IP processing section 303 receives a normal IP packet. Accordingly, in this case, the IP protocol number of the received data does not match the port number (the port number 50) for the ESP, which is IPSec data. Thus, in step S403 (FIG. 6), the IP processing section 303 determines that it is not necessary to perform the IPSec processing on the received data, converts the received data into a TCP/UDP packet, and sends the converted TCP/UDP packet to the TCP/UDP processing section 306.

In step S411 (FIG. 6), the TCP/UDP processing section 306 performs, with respect to the received TCP/UDP packet, processing for controlling a TCP protocol defined by the RFC 793 and a UDP protocol defined by the RFC 768. Then, the processing advances to step S410 (FIG. 6). In step S410, the TCP/UDP processing section 306 sends the data portion of the TCP/UDP packet to the application processing section 307.

In the above-described case illustrated in FIG. 7 where a normal IP packet is transmitted, the CPU 101 does not perform the IPSec processing even when data has been received.

Accordingly, in this case, in the IPSec hardware suspension management processing illustrated in FIG. 5, it is determined in step S501 (FIG. 5) that the status of the data processing apparatus 100 satisfies the hardware suspension condition. In this case, in step S502 (FIG. 5), the IPSec hardware processing section 304 is powered off. Thus, the power consumption can be reduced.

Next, LAN interface processing performed in the case where an IPSec packet is received when the IPSec hardware processing section 304 is not suspended will be described below with reference to FIG. 8.

Figure 8:
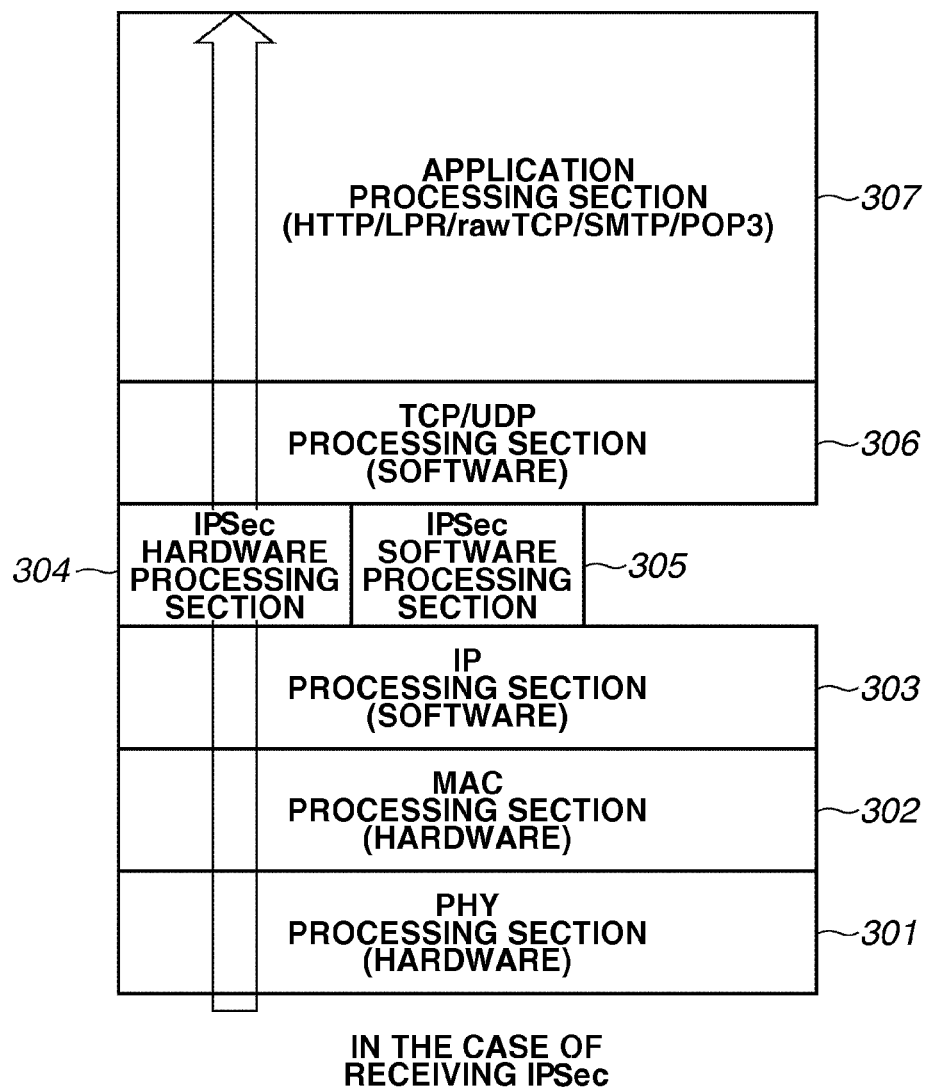
FIG. 8 illustrates LAN interface processing performed in the case where an IPSec packet is received when an IPSec hardware processing section is not suspended, according to an exemplary embodiment of the present invention.

FIG. 8 illustrates an example of LAN interface processing performed in the case where an IPSec packet is received when the IPSec hardware processing section 304 is not suspended, according to the present exemplary embodiment.

Referring to FIG. 8, in step S401 (FIG. 6), the IP processing section 303 (the CPU 101) receives data of one packet via the network 109. In step S402 (FIG. 6), the IP processing section 303 performs IP header analysis processing. Further, the IP processing section 303 extracts the IP protocol number included in an IP header.

In step S403 (FIG. 6), the IP processing section 303 determines whether it is necessary to perform the IPSec processing on the received data. In the example illustrated in FIG. 8, the IP processing section 303 receives an IPSec packet. Accordingly, in this case, the IP protocol number of the received data matches the port number (the port number 50) for the ESP, which is IPSec data. Thus, in step S403 (FIG. 6), the IP processing section 303 determines that it is necessary to perform the IPSec processing on the received data.

In step S404 (FIG. 6), the CPU 101 determines whether the IPSec hardware processing section 304 has been suspended. In the example illustrated in FIG. 8, the IPSec hardware processing section 304 has not been suspended. Accordingly, in this case, the CPU 101 performs control so that the received data (the ESP) is sent from the IP processing section 303 to the IPSec hardware processing section 304 (that is, the processing advances to step S405).

In step S405 (FIG. 6), the IPSec hardware processing section 304 decodes (decompresses) the ESP which has been sent from the IP processing section 303, converts the decoded ESP into a TCP/UDP packet, and sends the TCP/UDP packet to the TCP/UDP processing section 306 (the CPU 101).

In step S407 (FIG. 6), after receiving the TCP/UDP packet from the IPSec hardware processing section 304, the TCP/UDP processing section 306 performs TCP/UDP header analysis processing. Further, the TCP/UDP processing section 306 extracts a sending destination port number.

In step S408 (FIG. 6), the CPU 101 determines whether the status of the data processing apparatus 100 satisfies a condition for activating g the IPSec hardware processing section 304. In the example illustrated in FIG. 8, the IPSec hardware processing section 304 has not been suspended. Accordingly, in this case, the IP processing section 303 determines that the status of the data processing apparatus 100 does not satisfy the condition for activating the IPSec hardware processing section 304. Then, the processing advances to step S410.

In step S410 (FIG. 6), the TCP/UDP processing section 306 sends the data portion of the received data to the application processing section 307.

In the example illustrated in FIG. 8, the IPSec hardware processing section 304 has not been suspended and an IPSec packet is received. Accordingly, in this case, in the processing for managing the IPSec hardware suspension illustrated in FIG. 5, it is determined in step S501 (FIG. 5) that the status of the data processing apparatus 100 does not satisfy the hardware suspension condition. In this case, in step S502 (FIG. 5), the IPSec hardware processing section 304 is not powered off. However, because the IPSec hardware processing section 304 has been in operation, the processing load on the CPU 101 does not increase. Thus, in this case, the CPU 101 can perform other processing.

Next, LAN interface processing performed in the case where IPSec data, on which the IPSec processing can be performed only by software, is received when the IPSec hardware processing section 304 is suspended will be described below with reference to FIG. 9.

Figure 9:
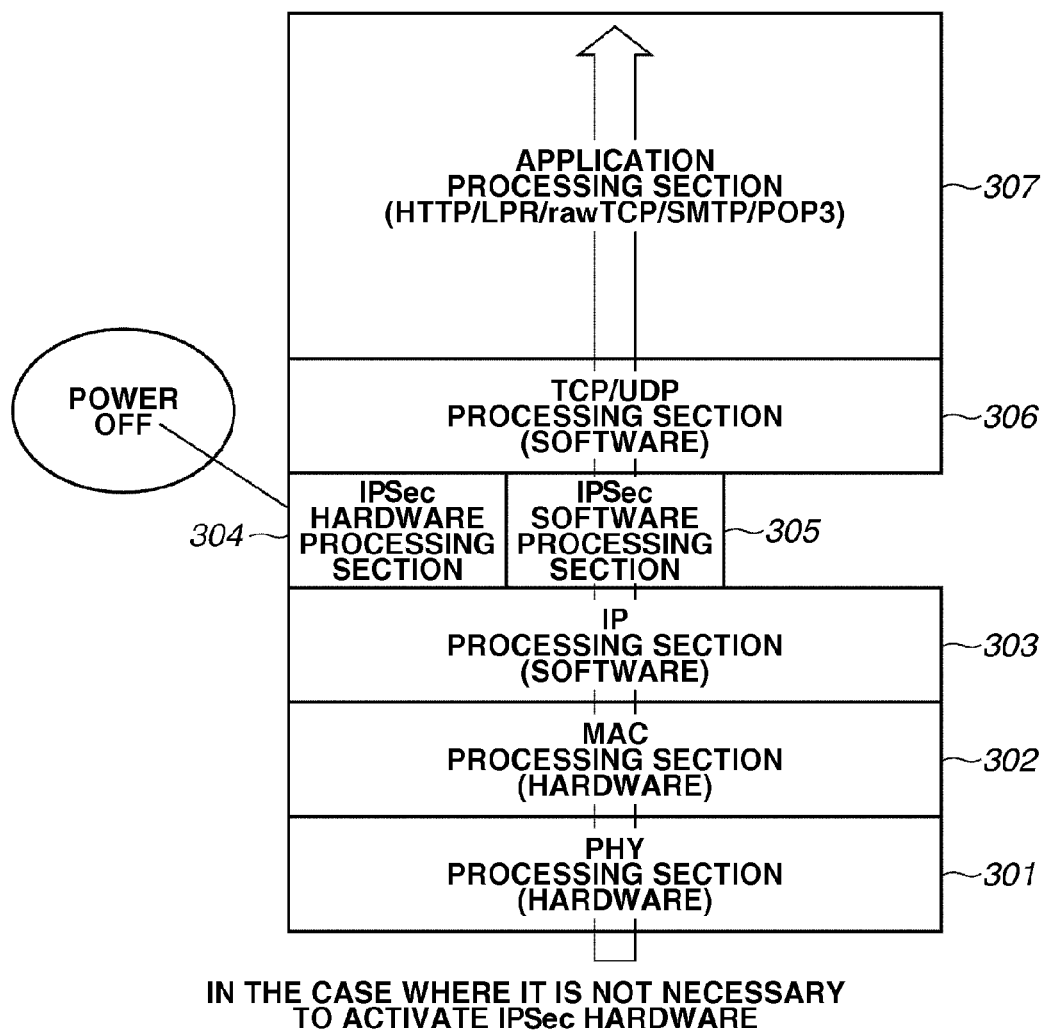
FIG. 9 illustrates LAN interface processing performed in the case where IPSec data on which IPSec processing can be performed only by software (for example, data compliant with an Internet control message protocol (ICMP) or an address resolution protocol (ARP)) is received when the IPSec hardware processing section is suspended, according to an exemplary embodiment of the present invention.

FIG. 9 illustrates an example of LAN interface processing performed in the case where IPSec data on which the IPSec processing can be performed only by software (for example, data compliant with the ICMP or the ARP) is received when the IPSec hardware processing section 304 is suspended, according to the present exemplary embodiment.

Referring to FIG. 9, in step S401 (FIG. 6), the IP processing section 303 (the CPU 101) receives data of one packet via the network 109. In step S402 (FIG. 6), the IP processing section 303 performs IP header analysis. Furthermore, here, the IP processing section 303 extracts the IP protocol number included in an IP header.

In step S403 (FIG. 6), the IP processing section 303 determines whether it is necessary to perform the IPSec processing on the received data. In the example illustrated in FIG. 9, the IP processing section 303 receives an IPSec packet. Accordingly, in this case, the IP protocol number of the received data matches the port number (the port number 50) for the ESP, which is IPSec data. Thus, in step S403 (FIG. 6), the IP processing section 303 determines that it is necessary to perform the IPSec processing on the received data.

In step S404 (FIG. 6), the CPU 101 determines whether the IPSec hardware processing section 304 has been suspended. In the example illustrated in FIG. 9, the IPSec hardware processing section 304 has been suspended. Accordingly, in this case, the CPU 101 performs control so that the received data (the ESP) is sent from the IP processing section 303 to the IPSec software processing section 305 (that is, the processing advances to step S406).

In step S406 (FIG. 6), the IPSec software processing section 305 decodes (decompresses) the ESP which has been sent from the IP processing section 303, converts the decoded ESP into a TCP/UDP packet, and sends the converted TCP/UDP packet to the TCP/UDP processing section 306 (the CPU 101).

In step S407 (FIG. 6), after receiving the TCP/UDP packet from the IPSec software processing section 305, the TCP/UDP processing section 306 performs TCP/UDP header analysis. Further, the TCP/UDP processing section 306 extracts a "sending destination port number".

In step S408 (FIG. 6), the CPU 101 determines whether the status of the data processing apparatus 100 satisfies a condition for activating the IPSec hardware processing section 304. In the example illustrated in FIG. 9, the IPSec hardware processing section 304 has been suspended. Accordingly, in this case, the IP processing section 303 compares the sending destination port number acquired in step S407 with the previously set port number (i.e., a port number for a protocol with which a large number of packets are transmitted (e.g., an LPR protocol or a raw TCP protocol) as described above in connection with the processing in step S501 in FIG. 5).

In the example illustrated in FIG. 9, IPSec data on which the IPSec processing can be performed only by software (data compliant with the ICMP or the ARP) is received. Accordingly, in this case, the sending destination port number acquired in step S407 (FIG. 6) does not match the previously set port number. Thus, the CPU 101 determines that the status of the data processing apparatus 100 does not satisfy the condition for activating the IPSec hardware processing section 304. Then, the processing advances to step S410.

In step S410, the TCP/UDP processing section 306 sends the data portion of the received data to the application processing section 307.

As described above, in the example illustrated in FIG. 9, the IPSec hardware processing section 304 has been suspended and the sending destination port number included in the TCP/UDP packet does not match the previously set port number of a predetermined protocol. Accordingly, in this case, the status of the data processing apparatus 100 does not satisfy the hardware starting condition. In this case, the IPSec hardware processing section 304 remains powered off (suspended). Thus, the power consumption can be reduced.

Now, LAN interface processing performed in the case where IPSec data on which the IPSec processing cannot be performed by software only (for example, data compliant with the LPR protocol or the raw TCP) is received when the IPSec hardware processing section 304 is suspended will be described below with reference to FIG. 10.

Figure 10:
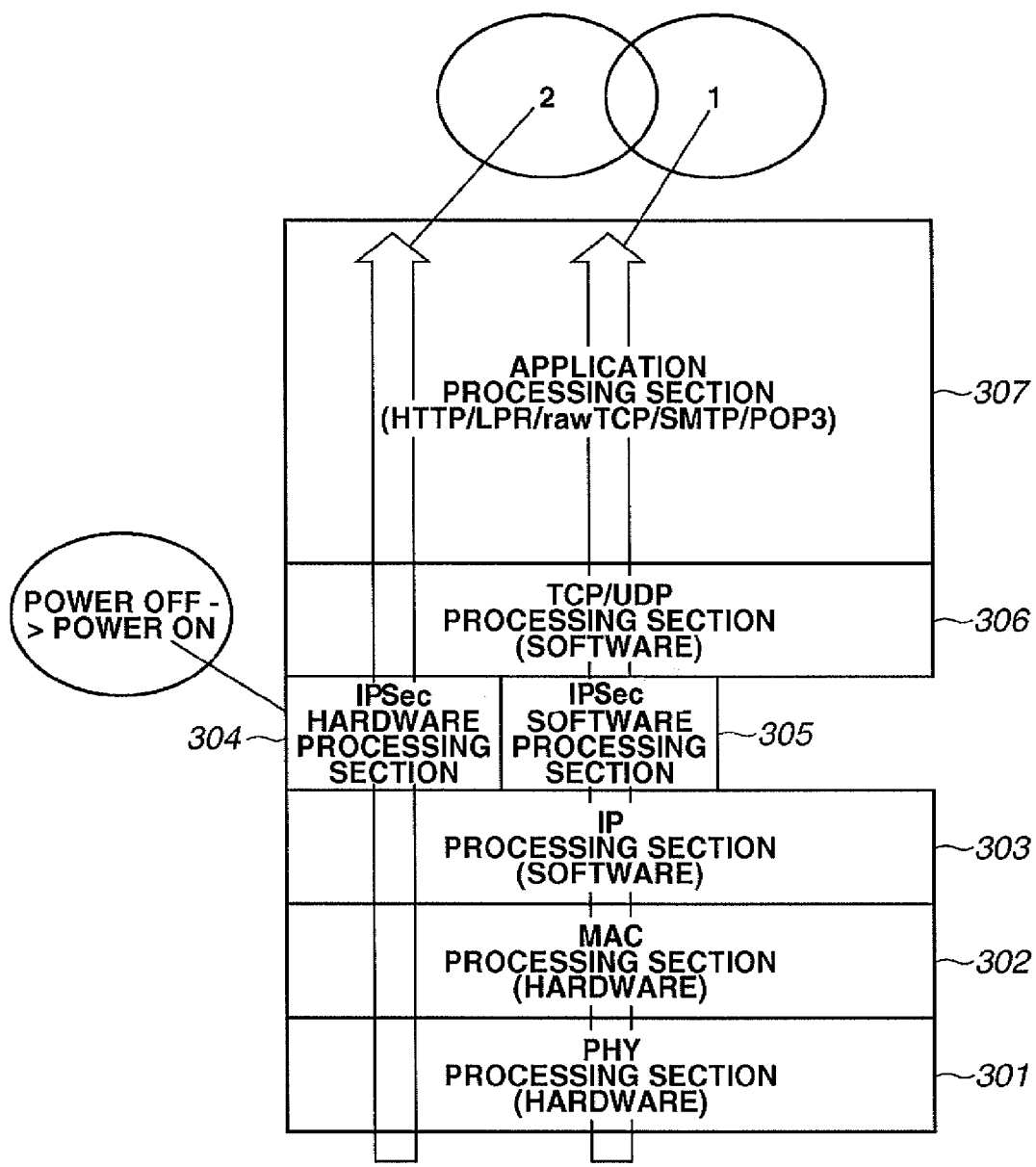
FIG. 10 illustrates LAN interface processing performed in the case where IPSec data on which the IPSec processing cannot be performed by software only (for example, data compliant to a line printer (LPR) protocol or a raw transmission control protocol (TCP) is received when the IPSec hardware processing section is suspended, according to an exemplary embodiment of the present invention.

FIG. 10 illustrates LAN interface processing performed in the case where IPSec data on which the IPSec processing cannot be performed by software only (for example, data compliant with the LPR protocol or the raw TCP) is received when the IPSec hardware processing section 304 is suspended, according to the present exemplary embodiment.

Referring to FIG. 10, in step S401 (FIG. 6), the IP processing section 303 (the CPU 101) receives data of one packet via the network 109. In step S402 (FIG. 6), the IP processing section 303 performs IP header analysis. Further, the IP processing section 303 extracts the IP protocol number included in an IP header.

In step S403 (FIG. 6), the IP processing section 303 determines whether it is necessary to perform the IPSec processing on the received data. In the example illustrated in FIG. 10, the IP processing section 303 receives an IPSec packet. Accordingly, in this case, the IP protocol number of the received data matches the port number (the port number 50) for the ESP, which is IPSec data. Thus, in step S403 (FIG. 6), the IP processing section 303 determines that it is necessary to perform the IPSec processing on the received data.

In step S404 (FIG. 6), the CPU 101 determines whether the IPSec hardware processing section 304 has been suspended. In the example illustrated in FIG. 10, the IPSec hardware processing section 304 has been suspended. Accordingly, in this case, the CPU 101 performs control so that the received data (the ESP) is sent from the IP processing section 303 to the IPSec software processing section 305 (that is, the processing advances to step S406).

In step S406 (FIG. 6), the IPSec software processing section 305 decodes (decompresses) the ESP which has been sent from the IP processing section 303, converts the decoded ESP into a TCP/UDP packet, and sends the TCP/UDP packet to the TCP/UDP processing section 306 (the CPU 101).

In step S407 (FIG. 6), after receiving the TCP/UDP packet from the IPSec software processing section 305, the TCP/UDP processing section 306 performs TCP/UDP header analysis. Further, the TCP/UDP processing section 306 extracts a sending destination port number.

In step S408 (FIG. 6), the CPU 101 determines whether the status of the data processing apparatus 100 satisfies a condition for activating the IPSec hardware processing section 304. In the example illustrated in FIG. 10, the IPSec hardware processing section 304 has been suspended. Accordingly, in this case, the IP processing section 303 compares the sending destination port number acquired in step S407 with the previously set port number (i.e., a port number for a protocol with which a large number of packets are transmitted to complete a data communication (for example, the LPR protocol or the raw TCP) as described with respect to the processing in step S501 in FIG. 5).

In the example illustrated in FIG. 10, IPSec data on which the IPSec processing cannot be performed by software only (data compliant with the LPR protocol or the raw TCP) is received. Accordingly, in this case, it is determined in step S408 (FIG. 6) that the sending destination port number acquired in step S407 (FIG. 6) matches the previously set port number. Thus, in this case, the CPU 101 determines that the status of the data processing apparatus 100 satisfies the condition for activating the IPSec hardware processing section 304. Then, the processing advances to step S409.

In step S409, the CPU 101 performs processing for activating the IPSec hardware processing section 304 to enable again the processing in step S405 (FIG. 6) by the IPSec hardware processing section 304. More specifically, the CPU 101 issues an instruction to the power controller 999 for starting the supply of power to the IPSec hardware processing section 304. After receiving the instruction for starting the supply of power to the IPSec hardware processing section 304, the power controller 999 starts the supply of power to the IPSec hardware processing section 304.

In step S410 (FIG. 6), the TCP/UDP processing section 306 sends the data portion of the received data to the application processing section 307. The above-described processing described with reference to FIG. 10 corresponds to the processing indicated in FIG. 10 with an arrow 1.

With respect to an IPSec packet, which is to be processed after starting the supply of power to the IPSec hardware processing section 304 in step S409 (FIG. 6), it is determined in step S404 that the IPSec hardware processing section 304 has not been suspended. Accordingly, in this case, the IPSec packet is to be processed by the IPSec hardware processing section 304. More specifically, the IPSec packet is processed by the processing from step S401, then to step S402, to step S403, to step S404, to step S405, to step S407, to step S408, and then to step S410. This is equivalent to processing to show in the arrow 2 of FIG. 10. This is the processing performed in the case indicated by an arrow 2 in FIG. 10.

In the example described above with reference to FIG. 10, the status of the IPSec hardware processing section 304 shifts from a suspended state to an activated (started) state. Accordingly, in this case, the processing load on the CPU 101 does not increase. Thus, the CPU 101 can perform other processing. Accordingly, in this case, in the IPSec hardware suspension management processing illustrated in FIG. 5, it is determined in step S503 (FIG. 5) that the IPSec hardware processing section 304 has not been suspended. In this case, the processing returns to step S501 to proceed with the processing for monitoring the hardware suspension condition satisfaction.

Second Exemplary Embodiment

Now, a second exemplary embodiment of the present invention will be described. In the above-described first exemplary embodiment, a user enters a port number for a protocol with which a large number of packets are transmitted to complete a data communication (for example, an LPR or a raw TCP) via the keyboard 105 and the entered port number is stored (set) in a non-volatile memory area of the RAM 103. In the present exemplary embodiment, a user enters a name of a protocol (i.e., the LPR protocol or the raw TCP) instead of entering a port number for a protocol with which a large number of packets are transmitted to complete a data communication via the keyboard 105 and the entered protocol name is stored (set) in a non-volatile memory area of the RAM 103.

In the present exemplary embodiment having such a configuration, the CPU 101 performs the following processing in determining in step S501 (FIG. 5) whether it is appropriate to perform processing on data received by the IPSec communication in the IPSec software processing section 305.

At the start of the processing, the CPU 101 acquires a protocol name based on the sending destination port number included in the received data (a TCP packet or a UDP packet), using a table previously stored in the ROM 102. If it is determined that the thus acquired protocol name does not match a previously set protocol name (the LPR protocol or the raw TCP/UDP), then the CPU 101 determines that it is appropriate to process the received data with the IPSec software processing section 305. On the other hand, if it is determined that the thus acquired protocol name matches a previously set protocol name, then the CPU 101 determines that it is inappropriate to process the received data with the IPSec software processing section 305.

In the TCP/UDP header analysis processing in step S407 (FIG. 6), the TCP/UDP processing section 306 extracts a sending destination port number from a TCP/UDP header portion, and acquires a protocol name from the extracted sending destination port number.

In determining whether it is appropriate to process the data received in S401 with the IPSec software processing section 305 in step S409 (FIG. 6), the CPU 101 performs the following processing.

That is, the CPU 101 determines whether the protocol name acquired in S407 matches the name of the previously set protocol.

If it is determined that the protocol name acquired in step S407 matches the name of the previously set protocol (the LPR protocol or the raw TCP), then the CPU 101 determines that it is inappropriate to process the received data with the IPSec software processing section 305. On the other hand, if it is determined that the protocol name acquired in step S407 does not match the name of the previously set protocol (the LPR protocol or the raw TCP), then the CPU 101 determines that it is appropriate to process the received data with the IPSec software processing section 305.

The configuration of the present exemplary embodiment will be described in more detail below with reference to FIG. 10. In the example illustrated in FIG. 10, the IPSec hardware processing section 304 has been suspended and IPSec data on which the IPSec processing cannot be performed by software only is received.

The processing in steps S401 through S406 (FIG. 6) are similar to those in the first exemplary embodiment. Accordingly, the description thereof will not be repeated here and only processing in step S407 (FIG. 6) and beyond will be described.

In step S407 (FIG. 6), after receiving the TCP/UDP packet from the IPSec software processing section 305, the TCP/UDP processing section 306 performs TCP/UDP header analysis. More specifically, the TCP/UDP processing section 306 performs processing for controlling a TCP protocol defined by the RFC 793 and a UDP protocol defined by the RFC 768. In addition, the TCP/UDP processing section 306 extracts a sending destination port number from the TCP/UDP header. Further, the CPU 101 acquires a protocol name from the sending destination port number using the table previously stored on the ROM 102.

In step S408 (FIG. 6), the CPU 101 determines whether the status of the data processing apparatus 100 satisfies a condition for activating the IPSec hardware processing section 304. In the example illustrated in FIG. 10, the IPSec hardware processing section 304 has been suspended. Accordingly, in this case, the IP processing section 303 compares the protocol name acquired in step S407 with the previously set protocol name (i.e., a name of a protocol with which a large number of packets are transmitted to complete a data communication (for example, the LPR protocol or the raw TCP) as described with respect to the processing in step S501 in FIG. 5).

In the example illustrated in FIG. 10, IPSec data on which the IPSec processing cannot be performed by software only (data compliant with the LPR protocol or the raw TCP) is received. Accordingly, in this case, it is determined in step S408 (FIG. 6) that the protocol name acquired in step S407 (FIG. 6) matches the name of the previously set protocol. Thus, in this case, the CPU 101 determines that the status of the data processing apparatus 100 satisfies the condition for activating the IPSec hardware processing section 304. Then, the processing advances to step S409 (FIG. 6).

The processing in each of steps S409 and S410 (FIG. 6) is similar to that in the first exemplary embodiment. Accordingly, the description thereof will not be repeated here.

Third Exemplary Embodiment

In the above-described exemplary embodiments, the processing performed when IPSec data is received is described. However, the present invention is not limited to these embodiments. That is, the present invention can be applied to a case where IPSec data is sent from the data processing apparatus 100 to another apparatus connected to the data processing apparatus 100 via the network 109.

That is, in the present exemplary embodiment, after a TCP/UDP packet is generated by the TCP/UDP processing section 306, the CPU 101 determines whether to send the TCP/UDP packet by the IPSec processing.

If it is determined that the TCP/UDP packet is not to be sent by the IPSec processing, then the CPU 101 sends the TCP/UDP packet to the IP processing section 303. Then, the IP processing section 303 performs the processing based on the received TCP/UDP packet and sends the thus processed data to the network 109 via the MAC processing section 302 and the PHY processing section 301.

On the other hand, if it is determined that the TCP/UDP packet is to be sent by the IPSec processing, then the CPU 101 further determines whether the IPSec hardware processing section 304 has been suspended.

If it is determined that the IPSec hardware processing section 304 has not been suspended (i.e., the IPSec hardware processing section 304 is currently powered on), then the CPU 101 performs control so that the TCP/UDP processing section 306 sends a TCP/UDP packet to the IPSec hardware processing section 304.

After receiving the TCP/UDP packet from the TCP/UDP processing section 306, the IPSec hardware processing section 304 encodes the received TCP/UDP packet with the ESP, converts the TCP/UDP packet into the ESP, and sends the converted ESP to the IP processing section 303. After receiving the ESP-converted TCP/UDP packet from the IPSec hardware processing section 304, the IP processing section 303 processes the data based on the received TCP/UDP packet and sends the thus processed data to the network 109 via the MAC processing section 302 and the PHY processing section 301.

On the other hand, if it is determined that the IPSec hardware processing section 304 has been suspended (i.e., the IPSec hardware processing section 304 is currently powered off), then the CPU 101 performs control so that the TCP/UDP processing section 306 sends the TCP/UDP packet to the IPSec software processing section 305.

The IPSec software processing section 305 encodes the TCP/UDP packet received from the TCP/UDP processing section 306 with the ESP, converts the TCP/UDP packet into the ESP, and sends the ESP-converted TCP/UDP packet to the IP processing section 303. After receiving the ESP-converted TCP/UDP packet from the IPSec software processing section 305, the IP processing section 303 processes the data based on the received TCP/UDP packet and sends the thus processed data to the network 109 via the MAC processing section 302 and the PHY processing section 301.

At the time the TCP/UDP packet is sent to the IPSec software processing section 305, the CPU 101 determines whether the status of the data processing apparatus 100 satisfies the hardware starting condition for activating the IPSec hardware processing section 304. The CPU 101 determines whether to power on the IPSec hardware processing section 304 based on a result of the determination.

The hardware starting condition corresponds to a condition that it has been determined that it is inappropriate to process the data to be sent using the IPSec software processing section 305. More specifically, the CPU 101 determines whether the sending destination port number of the TCP/UDP packet to be sent matches a previously set port number (i.e., a port number for a protocol with which a large number of packets are transmitted to complete a data communication (for example, the LPR protocol or the raw TCP protocol) as described with respect to the processing in step S501 in FIG. 5).

The CPU 101 determines that it is inappropriate to process the TCP/UDP packet to be sent using the IPSec software processing section 305 if the sending destination port number of the TCP/UDP packet to be sent matches the previously set port number. On the other hand, if the sending destination port number of the TCP/UDP packet to be sent does not match the previously set port number, then the CPU 101 determines that it is appropriate to process the TCP/UDP packet using the IPSec software processing section 305.

If it is determined that it is appropriate to process the data using the IPSec software processing section 305 (i.e., the status of the data processing apparatus 100 does not satisfy the hardware starting condition), then the CPU 101 does not perform any particular hardware starting processing.

On the other hand, if it is determined that it is inappropriate to process the data to be sent with the IPSec software processing section 305 (i.e., the status of the data processing apparatus 100 satisfies the hardware starting condition), then the CPU 101 performs the hardware starting processing.

More specifically, the CPU 101 issues an instruction to the power controller 999 for starting the supply of power to the IPSec hardware processing section 304. After receiving the instruction for starting the supply of power, the power controller 999 starts the supply of power to the IPSec hardware processing section 304.

Accordingly, hereafter in this case, the TCP/UDP packet is processed by the IPSec hardware processing section 304. Thus, a load on the CPU 101 in processing a protocol with which a large number of packets are transmitted to complete a data communication can be reduced.

Fourth Exemplary Embodiment

A fourth exemplary embodiment of the present invention will now be described. In the present exemplary embodiment, an operation mode of the data processing apparatus 100 includes a processing speed priority mode and a power saving priority mode.

In the present exemplary embodiment, when a user operates the keyboard 105 to select and designate the processing speed priority mode or the power saving priority mode as the operation mode of the data processing apparatus 100, the CPU 101 stores (sets) the designated operation mode in a non-volatile memory area of the RAM 103. The operation mode is set to the processing speed priority mode as a default setting.

In the processing speed priority mode, the CPU 101 performs the above-described processing as described with reference to FIG. 6. That is, in steps S408 and S409, the CPU 101 performs control for starting the supply of power to the IPSec hardware processing section 304 if it is determined that the status of the data processing apparatus 100 satisfies the hardware starting condition (step S408 of FIG. 6). According to the present exemplary embodiment having the above-described configuration, the load on the CPU 101 in the case of performing the IPSec processing can be reduced. Thus, the possible reduction of the processing speed of the data processing apparatus 100 in the case of performing the IPSec processing can be prevented.

On the other hand, in the power saving priority mode, the CPU 101 performs an operation different from the operation in steps S408 and S409 (FIG. 6). More specifically, the CPU 101 performs control so that the supply of power to the IPSec hardware processing section 304 is not started even if it is determined that the status of the data processing apparatus 100 satisfies the hardware starting condition (step S408 of FIG. 6). According to the present exemplary embodiment having the above-described configuration, the power consumption of the data processing apparatus 100 can be reduced.

Accordingly, the user can prevent the possible reduction of processing speed of the data processing apparatus 100 in the case of performing the IPSec processing and reduce the power consumption of the data processing apparatus 100 by merely selecting and setting the operation mode of the data processing apparatus 100.

Fifth Exemplary Embodiment

Now, a fifth exemplary embodiment of the present invention will be described below. In the above-described exemplary embodiments, the data processing apparatus 100 includes the IPSec accelerator 110. In the present exemplary embodiment, the data processing apparatus 100 includes the IPSec hardware processing section 304 within the LAN I/F 107, instead of including the IPSec accelerator 110 separately.

Figure 11:
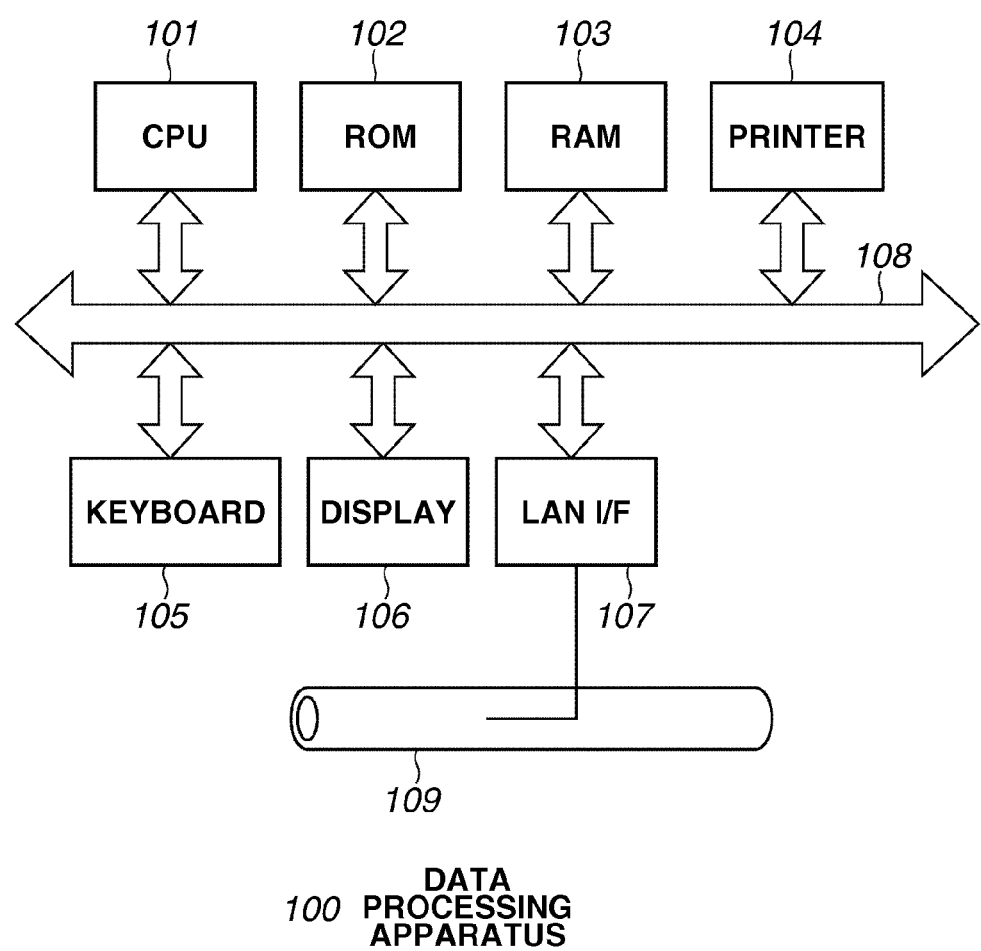
FIG. 11 illustrates a configuration of a data processing apparatus according to a fifth exemplary embodiment of the present invention.

FIG. 11 illustrates an example of a configuration of the data processing apparatus 100 according to the fourth exemplary embodiment of the present invention.

Figure 12:
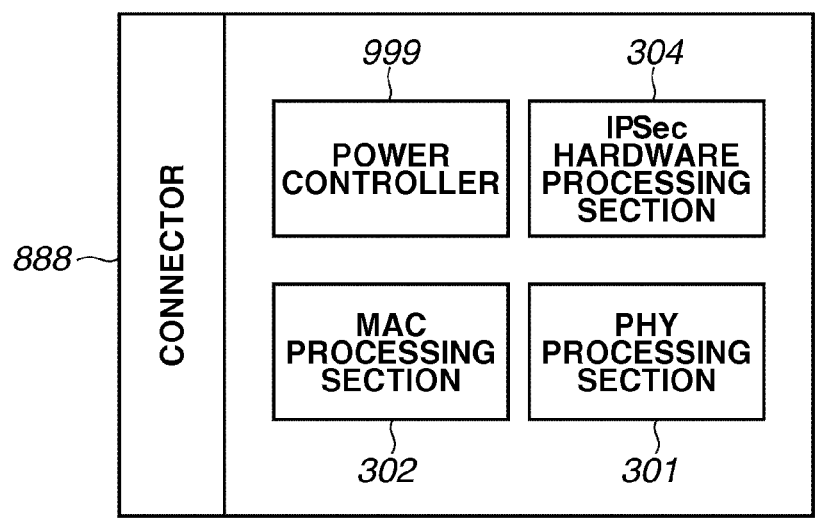
FIG. 12 illustrates a configuration of a LAN interface (I/F) illustrated in FIG. 11 according to the fourth exemplary embodiment of the present invention.

FIG. 12 illustrates an example of a configuration of the LAN I/F 107 illustrated in FIG. 11.

Referring to FIG. 12, a connector 888 is a unit for connecting the LAN I/F 107 to the data processing apparatus 100 via the bus 108. A power controller 999 is supplied with power from a power source unit (not illustrated) of the data processing apparatus 100 and supplies power to each section and unit of the LAN I/F 107. In addition, the power controller 999 can switch between a power supply mode for supplying power to the IPSec hardware processing section 304 and a power supply suspension mode for discontinuing the power supply to the IPSec hardware processing section 304 based on an instruction from the CPU 101.

Except for the above-described point, the configuration of the present exemplary embodiment is similar to that of the above-described first to fourth exemplary embodiments. Accordingly, the description thereof will not be repeated here.

Sixth Exemplary Embodiment

A sixth exemplary embodiment of the present invention will now be described. In the above-described embodiments, the CPU 101 performs control of the IPSec protocol processing by hardware or software. However, the function of the data processing apparatus 100 of the present invention is not limited to controlling the hardware or the software that performs the IPSec protocol processing. That is, the present invention can be applied to the control of hardware or software that performs processing by protocol such as a secure sockets layer (SSL) protocol, in which a CPU is subjected to a high processing load.

In the present exemplary embodiment, the data processing apparatus 100 includes an SSL hardware processing section and an SSL software processing section. The SSL hardware processing section performs SSL protocol processing by hardware. The SSL software processing section performs, by software, the SSL protocol processing similar to that performed by the SSL hardware processing section.

The CPU 101 discontinues the power supply to the SSL hardware processing section if it is determined that the status of the data processing apparatus 100 satisfies a condition for suspending the supply of power to the SSL hardware processing section. The condition for suspending the supply of power to the SSL hardware processing section includes a condition that no SSL data has been received or that the SSL data has been received and it is appropriate to process the received SSL data with the SSL software processing section.

If the SSL hardware processing section has been powered on at the time of performing the SSL protocol processing on the data, then the CPU 101 performs control so that the SSL hardware processing section performs the SSL protocol processing. On the other hand, if the SSL hardware processing section has not been powered on (i.e., the SSL hardware processing section is suspended) at the time of performing the SSL protocol processing on the data, then the CPU 101 performs control so that the SSL software processing section performs the SSL protocol processing.

Further, the CPU 101 performs control so that the supply of power to the SSL hardware processing section is started if the status of the data processing apparatus 100 satisfies the power supply starting condition (i.e., if the SSL data has been received and it is inappropriate to process the SSL data with the SSL software processing section).

Seventh Exemplary Embodiment

A seventh exemplary embodiment of the present invention will now be described. In the above-described first to sixth exemplary embodiments, the data processing apparatus 100 performs control by hardware or by software in communication protocol processing. However, the present invention is not limited to these embodiments. For example, the present invention can be applied to a data processing apparatus that controls hardware or software that performs three-dimensional (hereinafter simply referred to as "3D") processing, which may cause a high processing load on a CPU. The processing performed in the case of 3D processing according to the present exemplary embodiment will be described below.

In the present exemplary embodiment, the data processing apparatus 100 includes a 3D hardware processing section and a 3D software processing section. The 3D hardware processing section performs the 3D processing by hardware. The 3D software processing section performs the 3D processing similar to that performed by the 3D hardware processing section by software.

The CPU 101 discontinues the power supply to the 3D hardware processing section if it is determined that the status of the data processing apparatus 100 satisfies a condition for suspending the power supply to the 3D hardware processing section (i.e., the user has not issued an instruction for starting the 3D processing or the user has issued an instruction to start the 3D processing and it is appropriate to perform the 3D processing with the 3D software processing section).

If the 3D hardware processing section has been powered on at the time of performing the 3D hardware processing, then the CPU 101 performs control so that the 3D hardware processing section performs the 3D hardware processing. On the other hand, if the 3D hardware processing section has been powered off at the time of performing the 3D hardware processing (i.e., if the supply of power to the 3D hardware processing section has been suspended), then the CPU 101 performs control so that the 3D software processing section performs the 3D processing.

Further, the CPU 101 performs control so that the supply of power to the 3D hardware processing section is started if the status of the data processing apparatus 100 satisfies the power supply starting condition (i.e., if the user has issued an instruction for performing the 3D processing and if it is inappropriate to perform the 3D processing with the 3D software processing section).

According to the above-described exemplary embodiments of the present invention, the problems of the increase of load on the CPU in a conventional method can be mitigated. That is, in the conventional method, if a data processing apparatus includes a hardware accelerator that performs IPSec processing, the processing load on the CPU can be reduced, however, the average power consumption of the entire data processing apparatus may increase. According to the above-described exemplary embodiments of the present invention, the load on the CPU can be reduced by providing the data processing apparatus 100 with the hardware accelerator (the IPSec accelerator 110) that performs the IPSec processing while preventing a possible increase in the average power consumption of the entire data processing apparatus 100.

Thus, according to the above-described exemplary embodiments of the present invention, the supply of power to a plurality of processing units (sections) that can perform the similar processing can be appropriately controlled and the power consumption of the data processing apparatus can be reduced while maintaining a high data processing speed.

Other Exemplary Embodiments

The exemplary embodiments of the present invention are as described above. The present invention can be implemented in a system, an apparatus, a method, a program, or a storage medium storing the program, for example. More specifically, the present invention can be applied to a system including a plurality of devices and to an apparatus that comprises only one device.

FIG. 13 illustrates a memory map of a storage medium that stores various data processing programs that can be read by the data processing apparatus 100 according to an exemplary embodiment of the present invention.

Although not shown in FIG. 13, information for managing the programs stored in the storage medium such as version information and information concerning the creator of a program, for example, can be stored in the storage medium. In addition, information that depends on an operating system (OS) of an apparatus which reads out the program, such as an icon for identifying and displaying the program, can be stored in the storage medium.

In addition, data that is subordinate to the various programs is also managed in a directory of the storage medium. In addition, a program for installing the various programs on a computer can be stored in the storage medium. In addition, in the case where a program to be installed is compressed, a program for decompressing the compressed program can be stored in the storage medium.

In addition, the functions according to the above-described exemplary embodiments shown in FIG. 5 and FIG. 6 can be implemented by a host computer using a program that is externally installed. In this case, the present invention is applied to the case where information including a program is supplied to an output device from a storage medium such as a CD-ROM, a flash memory, and a floppy disk (FD) or from an external storage medium through a network.

The present invention can also be achieved by providing a system or an apparatus with a storage medium storing program code of software implementing the functions of the embodiments and by reading and executing the program code stored in the storage medium with a computer of the system or the apparatus (a CPU or a micro processing unit (MPU)).

In this case, the program code itself, which is read from the storage medium, implements the functions of the embodiments described above, and accordingly, the storage medium storing the program code constitutes the present invention.

Accordingly, the program can be configured in any form, such as object code, a program executed by an interpreter, and script data supplied to an OS.

As the storage medium for supplying such program code, a floppy disk, a hard disk, an optical disk, a magneto-optical disk (MO), a compact disk-read only memory (CD-ROM), a CD-recordable (CD-R), a CD-rewritable (CD-RW), a magnetic tape, a non-volatile memory card, a ROM, and a digital versatile disk (DVD (DVD-recordable (DVD-R) or DVD-rewritable (DVD-RW)), for example, can be used.

The above program can also be supplied by connecting to a web site on the Internet by using a browser of a client computer and by downloading the program from the web site to a storage medium such as a hard disk. In addition, the above program can also be supplied by downloading a compressed file that includes an automatic installation function from the web site to a storage medium such as a hard disk. The functions of the above embodiments can also be implemented by dividing the program code into a plurality of files and downloading each divided file from different web sites. That is, a World Wide Web (WWW) server and a file transfer protocol (ftp) server for allowing a plurality of users to download the program file for implementing the functional processing constitute the present invention.

In addition, the above program can also be supplied by distributing a storage medium such as a CD-ROM and the like which stores the program according to the present invention after an encryption thereof; by allowing the user who is qualified for a prescribed condition to download key information for decoding the encryption from the web site via the Internet;

and by executing and installing in the computer the encrypted program code by using the key information.

In addition, the functions according to the embodiments described above can be implemented not only by executing the program code read by the computer, but also implemented by the processing in which an OS or the like carries out a part of or the whole of the actual processing based on an instruction given by the program code.

Further, in another aspect of the embodiment of the present invention, after the program code read from the storage medium is written in a memory provided in a function expansion board inserted in a computer or a function expansion unit connected to the computer, a CPU and the like provided in the function expansion board or the function expansion unit carries out a part of or the whole of the processing to implement the functions of the embodiments described above.

In addition, the present invention can be applied to a system including a plurality of devices and to an apparatus that includes one device. Furthermore, the present invention can be implemented by supplying a system or an apparatus with a program. In this case, by reading the storage medium that stores a program described by software that can implement the present invention with the system or the apparatus, the system or the apparatus can implement the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-175327 filed Jul. 3, 2007, which is hereby incorporated by reference herein in its entirety.

What is claimed is:

1. A data processing apparatus comprising:
    a receiving unit configured to receive encrypted packet-data via a network;
    a processing unit configured to decrypt the encrypted packet-data received by the receiving unit;
    a control unit configured to decrypt the encrypted packet-data received by the receiving unit;
    a power supply unit configured to supply electronic power to the processing unit; and
    wherein the control unit transmits the encrypted packet-data received by the receiving unit to the processing unit in a case where the electronic power is being supplied to the processing unit when the receiving unit receives the encrypted packet-data, and decrypts the encrypted packet-data in a case where the electronic power is not being supplied to the processing unit when the receiving unit receives the encrypted packet-data, and
    wherein the control unit issues, to the power supply unit, an instruction to supply the electronic power to the processing unit, in a case where a port number obtained by decrypting the encrypted packet-data corresponds to a predetermined port number.

2. The data processing apparatus according to claim 1, wherein the processing unit decrypts the encrypted packet-data by hardware, and wherein the control unit decrypts the encrypted packet-data by software.

3. The data processing apparatus according to claim 1, wherein the decrypting of the encrypted packet-data is processing compliant with a predetermined communication protocol.

4. The data processing apparatus according to claim 3, wherein the predetermined communication protocol includes either an IPSec protocol or an SSL protocol.

5. The data processing apparatus according to claim 3, wherein if electronic power is not being supplied to the processing unit when the receiving unit receives the encrypted packet-data, and if the encrypted packet-data is compliant with the predetermined communication protocol, the control unit controls the power supply unit to supply the electronic power to the processing unit.

6. The data processing apparatus according to claim 3, wherein if electronic power is not being supplied to the processing unit when the receiving unit receives data, and if a sending destination port number included in the received data is a predetermined port number, the control unit controls the power supply unit to supply the electronic power to the processing unit.

7. A method for controlling a data processing apparatus including a receiving unit configured to receive encrypted packet-data via a network, a processing unit configured to decrypt the encrypted packet-data received by the receiving unit, a control unit configured to decrypt the encrypted packet-data received by the receiving unit, and a power supply unit configured to supply electronic power to the processing unit, the method comprising:
    determining whether or not electronic power is supplied by a power supply unit to the processing unit, when the receiving unit has received the encrypted packet-data;
    transmitting the encrypted packet-data received by the receiving unit to the processing unit in a case where the electronic power is being supplied to the processing unit when the receiving unit receives the encrypted packet-data;
    obtaining a port number by decrypting the encrypted packet-data by the control unit; and
    issuing by the control unit, to the power supply unit, an instruction to supply the electronic power to the processing unit, in a case where it is determined that the obtained port number corresponds to a predetermined port number.

8. The data processing apparatus according to claim 1, wherein the processing unit is capable of performing only the decrypting the encrypted packet-data, and wherein the control unit is capable of performing the predetermined processing and also performing processing other than the decrypting the encrypted packet-data.

9. The data processing apparatus according to claim 1, wherein the control unit issues, to the power supply unit, an instruction for starting a supply of electronic power to the processing unit, in a case where the control unit determines to start the supply of electronic power to the processing unit.

10. The data processing apparatus according to claim 1, wherein the control unit determines to start the supply of electronic power to the processing unit, in a case where the decrypted packet-data is print data.

11. The data processing apparatus according to claim 1, wherein the control unit determines not to start the supply of electronic power to the processing unit, in a case where the decrypted packet-data is data based on Internet Control Message Protocol (ICMP) or Address resolution protocol (ARP).

12. The data processing apparatus according to claim 1, wherein the processing unit or the control unit converts the encrypted packet-data into TCP/UDP packet data.

13. The data processing apparatus according to claim 1, wherein the pre-determined port number is a port number assigned to an application for performing printing.

* * * * *